United States Patent [19]

Bernat

[11] 4,247,410
[45] Jan. 27, 1981

[54] COMPOSITION FOR DISPENSING IN MANNER OF AEROSOL, PRESSURIZING CATALYST USEFUL THEREIN, PRECURSORS THEREOF, AND THEIR PREPARATION

[75] Inventor: Fred B. Bernat, Cliffside Park, N.J.

[73] Assignee: Humatec Resources, Inc., New York, N.Y.

[21] Appl. No.: 916,931

[22] Filed: Jun. 19, 1978

Related U.S. Application Data

[63] Continuation-in-part of Ser. No. 795,115, May 9, 1977, abandoned, and Ser. No. 810,103, Jun. 27, 1977, abandoned.

[51] Int. Cl.³ .......................... C09K 3/30; B01J 27/06
[52] U.S. Cl. ......................................... 252/305; 222/4; 252/90; 252/313 R; 252/350; 252/442; 252/DIG. 10; 424/44; 424/DIG. 1; 426/116
[58] Field of Search .................... 252/305, 350, 442; 424/44

[56] References Cited

U.S. PATENT DOCUMENTS

| 3,396,112 | 8/1968 | Burrows | 252/350 X |
| 3,446,893 | 5/1969 | Hanford et al. | 252/350 X |

OTHER PUBLICATIONS

"Aerosol Without Propellant", Drug and Cosmetic Industry; vol. 97, No. 2, Aug. 1965, pp. 201–203.

*Primary Examiner*—Richard D. Lovering

[57] ABSTRACT

An activated silicon-containing aluminum complex containing minor amounts of halogen, silicon, oxygen and hydrogen, the silicon being present in amounts of at least trace and having a hexagonal structure; the ratio of oxygen to hydrogen in the complex usually being 16:18. A process for making such complex comprises the steps of treating substantially pure aluminum with acid, then with mercury, then with a halogen acid again to form a slurry therein; said slurry is then applied under heat and low humidity to an aluminum material containing trace to about 2% by weight silicon to form a growth of powder thereon; this powder is then treated with a flow of hydrogen to form the complex which is capable of releasing oxygen and hydrogen from an oxygen and hydrogen-containing fluid.

35 Claims, 5 Drawing Figures

COMPOSITION FOR DISPENSING IN MANNER OF AEROSOL, PRESSURIZING CATALYST USEFUL THEREIN, PRECURSORS THEREOF, AND THEIR PREPARATION

BACKGROUND OF THE INVENTION

This invention is a continuation-in-part of my patent application Ser. No. 795,115 filed May 9, 1977 now abandoned and my patent application Ser. No. 810,103 filed June 27, 1977 now abandoned.

The present invention relates to a novel silicon-containing aluminum complex and to method for the preparation thereof. More particularly the complex of this invention contains minor amounts of halogen, activated silicon, oxygen and hydrogen in certain relationship, whereby said complex has the capability when added to a hydrogen and oxygen-containing fluid to release oxygen and hydrogen thereform and to so energize such fluid that oxygen and hydrogen will continue to be released therefrom. This invention also relates to the intermediate slurry formed during the process of making the complex.

The usefulness of the complex of this invention will extend virtually to any application where such energizing ability would be advantageous. For example, the complex of this invention will effect the pressurization of a confined container including any one of a myriad of active ingredients or adjuvants, e.g., non-food foam products such as shave creams, shampoos, oven cleaners; foods such as whipped toppings and cheese spreads; low viscosity personal and household products such as hairsprays, deodorants, insecticides, colognes, antiseptics and medicants; high viscosity products such as paints, varnishes and acrylic coatings; which ingredients or adjuvants can then be expelled from said container in the form desired, e.g., as a gas, liquid, solid or foam. In effect, therefore, the complex of this invention provides a dramatic replacement for the gas initiated aerosol propellants, particularly the fluorocarbons but also hydrocarbon and compressed gas systems. Moreover, unlike the fluorocarbons, the subject complex is non-polluting and safe environmentally having no adverse impact of any kind on ozone. Coupled with its non-reactiveness and non-flamability, and the minor amounts needed for such energizing, the potential implications of the subject complex are enormous.

In addition to its usefulness in making the complex, the intermediate slurry is also useful in the preparation of other products such as the "fuel" disclosed in my patent application Ser. No. 810,103 filed June 27, 1977 now abandoned.

SUMMARY OF THE INVENTION

It is an object of the subject invention to provide an activated silicon aluminum complex which is capable of releasing oxygen and hydrogen from an oxygen and hydrogen-containing fluid.

Another object of the subject invention is to provide a unique slurry intermediate.

Another object of the subject invention is to provide a method for the preparation of said silicon-aluminum complex, including the preparation of the slurry intermediate.

Another object of this invention is to provide a method for energizing a hydrogen and oxygen-containing fluid.

Another object of this invention is to provide a method for releasing oxygen and hydrogen under pressure from a hydrogen and oxygen-containing fluid, from a confined container, preferably in the presence of a catalytic amount of aluminum.

Another object of this invention is to provide a confined container containing activated or energized ingredients from which container solid, gas, liquid or foam can be dispensed under pressure.

Still other objects will become apparent from the ensuing description and appended claims and drawings.

According to this invention, the activated aluminum complex consists essentially of aluminum and minor amounts of chlorine, activated hexagonally structured silicon, oxygen and hydrogen; the oxygen and hydrogen being present in atomic proportions of ususally 16:18 or occasionally 14:16, 18:20 or mixtures thereof and the sum of said chlorine, silicon, hydrogen and oxygen atoms not exceeding more than about 5 percent by weight of the aluminum atoms of said complex.

The complex can be prepared by the following sequence of steps:

(1) contacting aluminum metal having a purity preferably on the order of at least about 99.97% by weight, but including at least trace amounts of silicon, with a source of acid of a type and concentration which will remove and inhibit the formation of oxide thereon; simultaneously or thereafter contacting said aluminum metal with mercury or less preferably a source of mercury in an oxygen-containing atmosphere;

(2) at least partly immersing said mercury-contacted aluminum in an acidic solution containing halogen to effect a slurry of particles of said mercury-contacted aluminum in said halogen-acidic solution, at a temperature of between ambient and not more than about 30°C.;

(3) increasing the pH of said slurry to the pH wherein such halogen as is now contained in the slurry material remains "active," i.e., not chemically bound, but is not liberated as halogen gas;

(4) contacting the surface of an aluminum material containing amounts of from trace to about 2% silicon atoms by weight, with the material of (3) above;

(5) heating said contacted surface to a temperature not higher than that at which the halogen would be liberated as a gas; and under conditions of low humidity to insure that a hydrogen halide is not formed; for a period at least sufficient to observe a powder growing from the contacted surface of the silicon atom-containing aluminum;

(6) removing said powder as desired and contacting such under substantially inert conditions with a flow of hydrogen gas, whereby the desired activated aluminum, chlorine, silicon, hydrogen and oxygen complex is formed.

BRIEF DESCRIPTION OF THE DRAWINGS

For a better understanding of the invention, reference will now be made to the accompanying drawings, wherein.

DETAILED DESCRIPTION OF THE INVENTION

Figure 1:
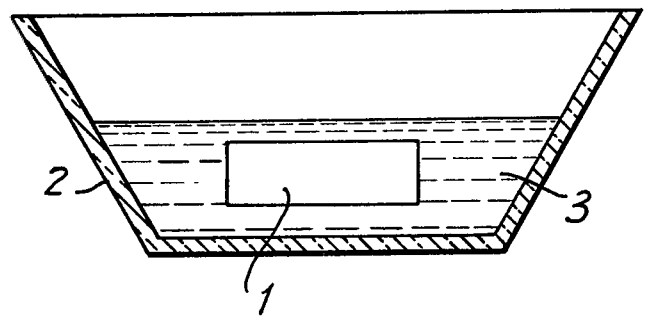
FIG. 1 is a schematic sectional elevational view of one embodiment of stage 1 of the process of the present invention.

The activated-silicon containing aluminum complex of this invention can be conveniently prepared utilizing a six stage process, although the process is not to be narrowly construed as being limited to such. The first stage, the preparation of a form of aluminum which can be termed "phase one" can typically be carried out as follows:

Utilizing the apparatus of FIG. 1, an aluminum bar or rod 1 is placed, as shown, in a vessel 2, the latter preferably of glass, and a thin layer of hydrochloric acid 3 is placed thereover slightly covering the aluminum. In this context, the shape of the aluminum is not narrowly critical. However, a bar or rod shape is generally preferred. The purpose of the acid treatment is to inhibit the formation of oxide on the aluminum surface. HCl is usually the acid employed for this purpose.

It is further important that the aluminum be substantially pure, on the order of but not limited to about 99.97% pure and also contain amounts of silicon on the order of trade to about 150 to about 300 ppm. As a practical matter, whether the aluminum is sufficiently pure can be empirically determined since, if there is an abrupt rise in temperature, this indicates oxide formation and that the aluminum starting material was not sufficiently pure. Therefore, for the purposes of this application, the term "substantially pure aluminum" denotes that degree of purity which is empirically determinable to be capable of being used in the process of this invention.

The aluminum is then contacted or coated with mercury, preferably by placing such in a bath of the same in a similar type apparatus; in the presence of an oxygen-gas-containing atmosphere, such as air. In either of these preliminary steps the temperature is not narrowly critical but should not be such as to encourage oxide formation and/or chlorine gas. Ambient temperature is satisfactory.

Figure 2:
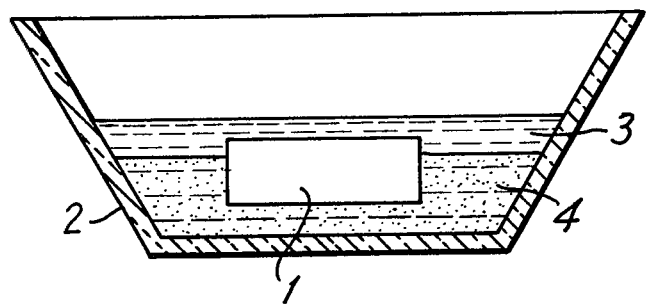
FIG. 2 is a schematic view similar to FIG. 1 showing another optional embodiment of stage one of the process of the present invention.

If desired, the acid and mercury contact can be made simultaneously as shown in FIG. 2. In this figure the aluminum 1 is immersed in the acid bath 3 and the heavier mercury bath 4, the HCl forming a layer on the bath of mercury.

Whether the apparatus or FIG. 1 or 2 or other suitable apparatus is used, the length of time of contact with the mercury can be minimal, on the order of between about fifteen and thirty seconds; longer contact, however, is not detrimental. within the context of this invention, the mercury acts only as a catalyst which effects a change in the aluminum structure. As indicated above this changed structure is "phase one."

The formation of "phase two" is the second stage in the process of this invention. This stage involves the formation of an intermediate slurry comprising phase one immersed in an acidic solution containing halogen. Particularly preferred among the suitable halogen acide solutions is hydrochloric acid.

Figure 3:
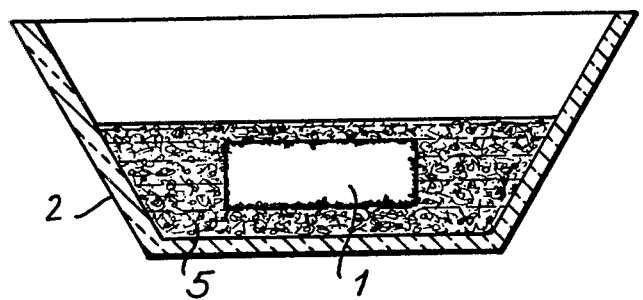
FIG. 3 is a schematic view similar to FIG. 1 showing the formation of the slurry in the HCl bath; in stage two of the process of the present invention. In this embodiement the aluminum is disposed substantially equidistant from the sides and bottom of the vessel.

The slurry can be formed in a number of ways and the method thereof is not critical in and of itself. For example, after contact with the mercury bath, the thus-treated aluminum rod or bar is then immersed in another vessel, containing a bath of HCl. The latter should usually have a normality of about 1 normal to about 2 normal, but the actual range of concentration is empirical. When phase one, which is soluble in HCl to some extent, is immersed in the acid solution, a rather viscous slurry, white in color, is formed. The slurry begins as a cloudy suspension and becomes increasingly denser. This is the consequence of particulate growth in and on the mercury-treated and activated aluminum bar or rod of phase one. This growth is shown in FIG. 3 wherein the thick slurry 5 is denoted as forming in the acid bath. As more and more particles form, the slurry becomes more and more viscous. Depending on the size of the aluminum bar or the amount of HCl present, the formation of the slurry can continue up to the entire consumation of the phase one aluminum material. However, as a practical matter, the reaction will usually stop before the aluminum bar is consumed completely because the slurry will become too dense for further growth to occur. At this point the thick slurry thus formed can be removed, partly or completely; additional HCl is then added and slurry formation continued. As a practical matter, the viscosity of the slurry can be as low as 10,000 cps. For most efficient use such viscosity should be between about 12,000 and 16,000 cps.

This slurry is "phase two." In the formation thereof pursuant to the preparation of the complex, the temperature is important, that is, between ambient and not more than about 30° C., preferably between about 22° C. and 25° C. It should be noted that a sudden adverse rise in temperature of the reaction environment at this point could again mean that the aluminum starting material was not sufficiently pure.

Alternatively, though less desirably, the slurry can also be made in situ in the embodiment represented by FIG. 2. As shown in FIG. 2, the aluminum bar or rod is covered by HCl but is also partly submerged in the source of mercury. Optionally, the HCl need not continue to cover the aluminum after oxide formation thereon is prevented or inhibited. A portion of the aluminum can be exposed above the surface. In either case, whether the HCl continues to cover the surface of the aluminum or not, a growth of some kind of complex occurs. This growth, itself, in this embodiment, is not the "phase two" slurry of this invention. The latter occurs in this "in situ" treatment, either when the particles of the "growth" "fall off" into the acidic portion of the HCl/Hg bath, or optionally after removing the complex growth (whether in the aluminum surface-exposed to air, or in that covered by acid) and immersing the same in a separate HCl bath to form the slurry as hereinbefore described. In either case the sequence has been followed of treating an oxide-free aluminum with mercury to change the structure of the aluminum and to effect its activation, and then contacting or continuing to contact said aluminum with HCl to cause the "phase two" slurry formation.

In the slurry-forming step, it has been found useful, in order to avoid undesirable heat from occurring, to position the aluminum bar or rod substantially equidistant from the sides and bottom of the vessel, or at a distance from the sides and bottom of the vessel which is essentially the same as or greater than the diameter of the bar or rod, a cylindrical rod shape being preferred. It is of course possible to inhibit formation of undesirable heat without the above-indicated special relationships; however, in this event the avoidance of oxides as a consequence of overheating would have to be constantly monitored. In this regard, for example, the treated bar could be constantly removed, rewashed, reinserted and recoated with mercury.

The phase two slurry is quite acidic with a pH level of between about 3 and about 4. It also contains both hydrogen, oxygen and chlorine atoms, probably in ionic form therein. The reason for this is that the phase one material has clathrate capabilities, i.e., it can entrap or confine the hydrogen, oxygen and chlorine ions within the particles of the slurry.

While the aforesaid temperature gradients are important when forming the slurry preparatory to the subsequent formation of the complex, it should be noted that the slurry itself can also be formed using somewhat higher temperatures, on the order of up to about 40° C., and also starting with aluminum of slightly less purity.

The next stage in the process of forming the final complex, i.e., stage three, is to adjust the pH so that the chlorine defined within the said particles of the slurry becomes active; "active" here meaning potentially unstable but not to the extent that the chlorine is liberated as chlorine gas. In this regard, it is desirable that the pH level of the slurry ultimately reside at a pH of about $5.4 \pm .0.1$. At this juncture, it could be noted that if the viscosity of the slurry is between about 12,000 and 16,000 cps, the slurry will contain between about 1.5 and about 3.0% aluminum suspended therein in elemental form.

The increase in pH is accomplished by treating the phase two material with a strong hydroxide such as NaOH or KOH. The normality of the latter is not critical but usually can be between about 2 and 3 normal concentration. The increased pH slurry can be termed "phase three." One can now go on to critical stage four.

On a surface of a silicon-containing aluminum material such as for example an aluminum foil normally used in the household, the phase three material is applied, preferably spread as a thin layer over the broadest area possible of the aluminum foil. It must be emphasized that while the aluminum material employed in this stage can be selected from a wide range of available types, it must also at least contain some silicon, i.e., from a trace up to about two percent or more by weight of the aluminum foil. The silicon atoms can normally be available as atomic silicon, or as the silicon in silica. It has been found that if the silicon is present in amounts greater than two percent, the rate of reaction slows, becomes irregular and harder to control. By the term "aluminum foil" is meant an originally anodized aluminum preferably containing not more than 3 or 4 percent of other materials, which is then deoxidized into the well known laminated form known as "foil."

Figure 4:
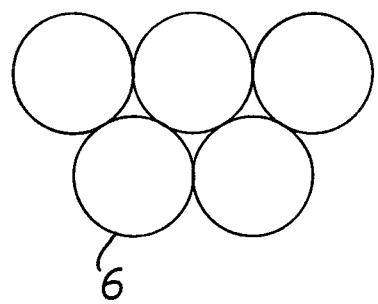
FIG. 4 is a depiction of the structure of the untreated, inactive silicon found in the aluminum foil used in stage four of the process of the present invention.
Figure 5:
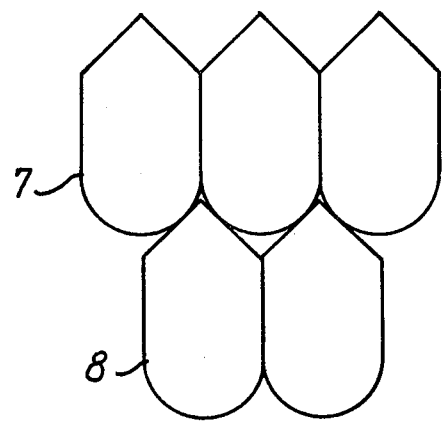
FIG. 5 is a depiction of the hexagonal structure of the silicon of the complex formed in stages five and six of the process of the present invention, or in the slurry intermediate.

With the application of phase three material to the foil, and the provision, simultaneously or shortly thereafter, of heat under conditions of low humidity, both the chlorine and the silicon atoms become highly activated. It has been found that the silicon atoms of the foil take on a structural hexagonal appearance. In FIG. 4 and FIG. 5 the transition from the normal spherical form of silicon in FIG. 4 to the hexagonal form 7 of silicon, critical to this invention, in FIG. 5 is depicted. The bottom position 8 of the silicon cells remains inexplicably somewhat rounded. This structural configuration is the consequence, apparently, of the energizing action of the entrapped chlorine atoms thereon. An internal endothermic reaction apparently occurs and the indicated structure results. (As stated previously, this change in structure also occurs in the aluminum particles of the slurry.) It should be noted again that the phase three material should preferably be spread widely in a thin layer on the aluminum foil to facilitate penetration of the silicon-containing aluminum foil. The heat applied must be such as to activate the chlorine atoms but again not so high that chlorine gas will be liberated. The low humidity is important to prevent the reformation of the hydrogen halide, e.g., hydrogen chloride. It has been found that a temperature of between about $40. \pm 0.5°$ C. is most preferred. The humidity of the heating atmosphere should be below about 20%.

A gray powder will begin to grow from the aluminum surface, usually after about 40 hours. The time of heating is not critical but again is empirical. Usually the pulverizing procedure will stop after about three or four days. Any suitable heating medium can be used, such as a simple oven with temperature humidity controls.

The powder so obtained can be termed "phase four." As stated above, it is believed that the growth of the same is the consequence of the action of the enrapped chlorine in the phase three material on the silicon of the aluminum being contacted. The "active" chlorine apparently attacks the aluminum containing-silicon, and uses the internal heat generated by the silicon under attack to create the growth of the phase four powder on the aluminum surface. The silicon atoms transformed into the hexagonal shape as shown in FIG. 5 remain in the new complex along with chlorine. At this stage, the oxygen-hydrogen ratio is 16:16, and/or occasionally 14:14 or 18:18, the latter being more desirable. Since there can be a mixture of these ratio values, the resulting ratio indication could also register as 15:15 or 17:17 or even 19:19. However, this "phase four" material is still not the pressurizing complex of this invention.

One further stage remains. The phase four powder is then subjected to a flow of hydrogen gas under substantially inert conditions, e.g., such as in a vacuum tube. This acts to further destabilize and activate the powder, and to saturate the powder with hydrogen. The resulting complex, i.e., "phase five" is thus capable of being further destabilized or activated, particularly when catalyzed by a small amount of aluminum, as will be described in greater detail later.

The resulting activated phase five powder is the desired final product of this invention. The complex thus formed has the appearance of an intensely dark-gray powder; it contains minor amounts of chlorine, silicon (in activated hexagonal form) and hydrogen and oxygen. The total amounts of the four "minor" constituents should not amount to more than 5 percent by weight of the aluminum. The amount of silicon will vary from trace to about 2 weight percent; the chlorine will be present at least in those amounts which are sufficient to activate, i.e., to "heat-up" the silicon, i.e., in order to change the shape of the silicon to substantially hexagonal form.

In the "phase five" complex, the ratio of oxygen to hydrogen will now be 16:18 (and/or, much less often, 14:16 or 18:20) or mixtures of the same (with a resulting indication of 15:17 or 17:19). This complex is intensely dark-gray in color and has been found to have a specific gravity of about 2.2. It will start melting at about 430° C. and be completely consumed at about 600° C.

The additional two hydrogen atoms obtained over the phase four material is the consequence of the hydrogen enriching step. As a consequence the ratio of oxygen to hydrogen changes as indicated; this could also be represented as follows:

(16 Oxygen:16 Hydrogen+2 Hydrogen; or 16 Oxygen:18 Hydrogen).

The two additional hydrogen atoms are evidently entrapped in the clathrate structure of phase four. The "phase five" material of this invention will remain "as is", i.e., stable, in its "superhydrogenated" activatable condition for a period of between 10 and 14 days at ambient temperatures. After a period the "excess" hydrogen will gradually be released (i.e., "lost"). At this point the material is again "phase four;" further hydrogenation, to return to the "active" state, is then necessary.

The activated complex, even in tiny amounts, as hereinafter described, will also have the unique ability to release oxygen and hydrogen from a hydrogen and oxygen fluid, particularly when a catalytic amount of aluminum metal is additionally present.

This invention can be further illustrated by the following examples. Unless otherwise indicated all percentages are by weight:

EXAMPLE 1—Formation of Slurry Intermediate 500 grams of aluminum rod, having not more than 0.1 impurities was placed in a 36 inch long shallow glass vessel as exemplified by FIG. 1. At a temperature of 20° C., the aluminum was contacted with 3N hydrochloric acid in amounts sufficient to cover the aluminum rod. Thereafter the aluminum rod was removed from the first HCl bath and immersed in a mercury bath for approximately 20 seconds under moist (about 30% humidity) air-atmospheric conditions. There also being a layer of HCl covering the mercury bath. The mercury contacted aluminum rod was then re-immersed in a bath of 2N HCl. At this point the rod was positioned equidistant from the sides and bottom of the vessel. A growth was observed on the immersed surface of aluminum, on all sides thereof. The aluminum bar also begins to dissolve in the HCl bath.

Almost immediately a milky white cloud began to appear. After about 8 hours a slurry began to be discernable. The temperature was kept below 30° C. The reaction continued until all of the aluminum bar was consumed. Before the bar was consumed, however, the slurry became so thick the reaction was severely inhibited. This occurred after about 48 hours. The thick slurry was then removed and fresh HCl added. This was continued until the dissolution of the aluminum was completed. The slurry had a pH of 3.5. The pH of the slurry was then adjusted to 5.4 by reducing the hydrogen ion content by addition of NaOH.

EXAMPLE 2—Formation of Complex

The slurry of Example 2 then was spread on a thin film over a surface of an ALCOA made commercially available aluminum foil containing about 1.2% silicon. The foil, with slurry thereon, was then heated at a temperature of about 40° C. while under substantially anhydrous conditions, i.e., a humidity of about 18.5%. After about two hours a slight growth of amorphous gray powder was observed growing from the foil. This continued for about 40 hours when growth ceased. At this point the temperature was reduced to ambient. (After about 72 hours it was observed that the pulverizing process ceased.) Powder was removed from the foil when growth ceased (i.e., after about 40 hours). At this point the powder was ascertained to have 16 atoms of hydrogen per molecule of complex (and 16 atoms of oxygen) as measured by gas chromatography of infrared spectrometer.

The gray powder was removed from the surface and was placed in a vacuum tube (horizontal with low traps). A stream of hydrogen was slowly passed over the powder, the flow being checked with a Beckmann analyzer, until the latter showed that the powder had acquired an additional two atoms of hydrogen, i.e., it now contained 18 atoms of hydrogen.

It was observed that if the vacuum tube was warmed slightly beforehand (by electrical coils) that the acquisition of $H_2$ was facilitated.

The traps of the vacuum tubes were emptied and an intensely dark-gray powder was removed. The specific gravity of such was 2.2.

Analysis now showed an oxygen to hydrogen atomic ratio of 16:18. This relationship persisted for about two weeks. After this time the enriched $H_2$ was found to have been substantially released, and the oxygen/hydrogen ratio was again measured at 16:16.

Further spectrographic analysis of the intense dark powder revealed the silicon hexagonal structure as shown in FIG. 5.

UTILITY AS PROPELLANT SUBSTITUTE

As a group, propellants, especially fluorocabons, which are used in aerosol compositions are under severe attack by environmental agencies. Among the deleterious effects being ascribed to such propellants, is their alleged adverse consequences on the ozone level of the upper atmosphere. There is, therefore, a great need for a viable replacement of the gaseous, existing propellants.

The complex of this invention meets this need. It is non-reactive, non-flammable but more importantly, in the commercial context, is non-pulluting and indifferent to ozone. It is soluble in almost any material within an extremely broad range of density, viscosity and temperature without affecting the chemical formulation or toxicity of the propelled material. It is totally releasable and expendable, leaving no residue in the aerosol package.

Moreover, in use, the subject inventive material has controllable parameters within accepted temperature/product requirements, as well as industry and government regulations. The pressure required will be maintained constant when the mateials treated by the complex are confined in a container or closed system. In this regard, vapor pressure is a function of temperature; the amount of complex needed can be easily varied according to the vapor pressure needed (using pure materials as a reference) for an aerosol under specified temperatures from −40° F. to +140° F. An ancillary benefit of the complex is that it is compatible with almost any packagable materials, which could not be used in an aerosol-type manner. Head space volume requirements are reduced allowing for major percent increases in product content. Furthermore, the complex does not affect storage stability of the product mixture, active ingredients and/or solvent solutions.

It is thus apparent that the inventive complex is a dramatic replacement for aerosol propellants. Yet it is not in fact a propellant per se. Rather it is an energizer, or perhaps more accurately a pressurizing catalyst, which will enable an adjuvant or active ingredient, to be expelled from a container, just as if a fluorocarbon were present in the container pushing the adjuvant or "active" out; that is, in the form of a foam gas, liquid, liquid spray or even solid. Indeed, a remarkable consequence of the effect of the inventive complex on any hydrogen and oxygen-containing composition, is that the latter itself is "energized" so that it retains an internal activating pressure, so that when pressure is released as with an ordinary aerosol cap, jet, or pump; a foam, liquid, solid, gas (depending on the type of "active" being used) will be ejected from a container containing the "energized" oxygen-hydrogen composition, continously until the container is emptied.

However, as indicated above, the amount of complex needed to effect "activation" is minimal; it will vary depending on two factors; the amount of hydrogen and oxygen containing material being energized or activated, and the percentage of hydrogen and oxygen in that material.

The relationship between the amount of complex necessary for "activation" and the substance being activated is also a function of the vapor pressure desired or required, and temperature. As a practical matter the complex is added in precisely measured gram amounts into the system to be treated, the latter being either closed initially or later, until the desired pressure is attained for the desired temperature.

A typical preparation of an energized "batch" can follow the following sequence:

1. Place an amount of complex as needed for vapor pressure and temperature requirements in a closed container including a prescribed composition, in which some ingredient thereof, which can be water, will contain hydrogen and oxygen. The container in which the complex and "chosen composition" are placed could have unfilled headspace as low as 2 or 3% by volume, and of course more if required by government regulations.

2. To the batch thus prepared, add a small amount of aluminum. The latter acts as a catalyst to the "energizing" action of complex on the hydrogen and oxygen containing composition. The reason aluminum acts as a catalyst is not fully understood, but it is preferred that such be employed, although the "energizing" will take place (although over a much longer period of time) without the aluminum catalyst. The amount of aluminum for this purpose is easily ascertainable as a function of catalytic action. A suitable amount of aluminum can be as little as 1 gram for every 4 or 5 grams of complex.

3. The mixing of complex with the composition to be activated is carried out in a closed system.

4. Temperature and vapor pressure requirements are monitored and factored into the "energizing" action.

5. From the master batch, individual containers, such as the usual retail aerosol type, can now be filled, preferably but not necessarily, previously vacuumed.

6. These containers are now "conditioned" or "energized." When pressure is released, the "active" ingredient will be expelled from the can in the desired form, e.g., foam, liquid spray, and the like,. The "active" ingredients can be expelled completely from the can; some residual pressure will remain in the can no matter how much is expelled, until the can is emptied. That is to say, as long as some energized "material" is in the can, such can be expelled with little change in pressurized action. A possible explanation follows:

After the addition of aluminum to the complex-containing batch, the "reaction", i.e., pressurization, starts almost immediately. It is believed that after about two or three minutes the "additional" two hydrogen atoms are expelled from the complex. These atoms (probably in the form of gaseous $H_2$ molecules) create kinetic energy in the "batch" and "attack" or agitate the already activated silicon, and also the aluminum catalyst. In turn it is believed that the excited silicon then "energizes" the hydrogen and oxygen ions of the hydrogen and oxygen-containing fluid and pressure builds up, filling the headspace. When such is placed in individual aerosol containers, the same action is reproduced on a mini-scale, i.e., the headspace of each container is "pressurized." When the pressure of the batch, or the mini-containers is "relieved" by valve or pump actuation, the "active" of the "batch" or "container" is expelled therefrom in the form, e.g., gas, foam, spray, etc., desired. It is to be emphasized that after each "actuation" the contents of the container (or bath) remains "pressurized." The headspace, under confinement, again is pressurized and the container is ready again (in a matter of seconds) to be actuated, i.e., the ingredients can again be expelled under pressure. This can continue until all of the contents of the container are evacuated, i.e., with no residue remaining.

An interesting corollary to the phenomena inherent in this invention, is that the master batch need not be energized in exact proportions required ab initio. To illustrate, if ten grams of complex are required to energize 100 gallons of "active" containing composition, at a required pressure of for example 40 psi., the same 10 grams can be placed in a smaller quantity, e.g., 10 gallons of "active." The latter quantity builds to a pressure of 400 psi., which can then be used by merely mixing with the additional 90 gallons at a later time, to complete the energization to a pressure of 40 psi.

The following example is illustrative of the preparation of material for use in "aerosol" type containers:

EXAMPLE 3

In a 1,000 gallon steel pressurizing mixing tank there was added 960 gallons of a glass cleaning composition having the following formulation:

90.56% water
9.00% butyl cellulose
0.30% ammonia
0.04% perfume
0.10% foaming agent (NINOL*)
(*TM - Rohm & Haas)

To the formulation there was then added 2 grams of aluminum metal in the form of a powder in an aluminum bag. The vat contained an unfilled headspace of approximately 2½%. To the vat there was then added 4 grams of the complex material of Example 1, said amount being sufficient to effect a vapor pressure of 40 psi at 70° F. The tank was sealed tightly. After about 50 minutes the contents of the tank were fed to a filling line, where individual valve-actuatable (aerosol type) containers, of different standard sizes, were then filled and sealed.

After filling, it was observed that when the valves of the cans were actuated a spray containing the glass cleaning composition was expelled therefrom. Such evacuation of contents under pressure continued until the container was completely empty. The vapor pressure remained constant at each actuation.

In like manner, as with Example 3, pressurized containers for oxygen and hydrogen fluid-containing shaving cream, shampoo, oven cleaner, whipped topping, hairspray, deodorant, insecticide, antiseptic and other comparable formulations are prepared, and the results noted in Example 3 are obtained.

THEORETICAL EXPLANATION

While the phenomena observed with this invention is not fully understood, it is thought that it may be somewhat explainable on the basis that the subgrain structure of aluminum appears to undergo profound changes when under chemical and electrochemical attack. Although the full significance of these changes and the full extent to which such changes control the characteristics of aluminum and alloys thereof is not yet fully established, it is believed that these changes in the subgrain structure furnish an explanation for some of the puzzling peculiarities of behavior which have been encountered.

A key step in the process of this invention would appear to be the formation of the slurry intermediate.

In this regard it should be noted that when ordinary aluminum is introduced into an HCl solution, e.g., 1N or 2N, the production of aluminum chloride (and water) occurs. However, the mercury treated aluminum employed in this invention is quite a different creature. There is still the formation of $AlCl_3$, and other aluminum compounds, e.g. aluminum oxide, possibly aluminum hydroxide and aluminum CH2 or hyarate as well, when such is immersed in the HCl solution. However, after the passage of from about 8 to about 72 hours a slurry is formed starting as a faint white cloud. This is a consequence of a "growth" on the "treated" aluminum which growth then "falls off" or "flakes off" into the acid bath and begins to form the slurry. After a passage of about 8 hours or so, the slurry is in full "bloom" and discernible increase in viscosity begins to occur, leading to a preferred viscosity range of 12,000 to 16,000 cps.

In this slurry, a relatively small amount, weightwise of "activated" aluminum growth particles is suspended; perhaps as a colloid. The percentage of the same is desiredly between about 1.5 and 3.0% by weight. These "growth" particles, however, now contain entrapped therein because of their clatherate properties, "free chlorine" (from the HCl) oxygen and hydrogen probably in molecular or ionic form. The silicon of the aluminum in the slurry has also been changed to the hexagonal structure.

Thus the slurry at least contains:

(a) The reaction product of aluminum and hydrochloric acid in solution, e.g., $Al^{+++}Cl^-$, $H^+$ and $OH^-$ ions.

(b) Free "activated" aluminum suspended, probably colloidally, containing hexagonally structured silicon and also additionally containing traces of chlorine, hydrogen and oxygen entrapped therein.

The unusual properties of the slurry may possibly also be explainable as a consequence of "Van der Waal's forces" or the well-known ability of particles in colloidal suspension to attract and retain on their surface dissolved substances and solvent molecules, i.e., to have molecules present in the solution even in ionic form become entrapped in or adhered on the particulate matter of the slurry or colloid. Whatever is the explanation, the slurry is a critical intermediate.

The minimum requirements for the formation of the slurry intermediate would appear to be as follows:

A. As stated previously, the aluminum starting material should be "pure." More particularly it should be essentially "oxide free." For the formation of the "slurry" the aluminum starting material must, however, have one "impurity," and that is silicon. Moreover, the amount of silicon "impurity" in the starting material is important. If too little, the necessary growth in and on the aluminum will not take place or take place too slowly to be practical. If too much, the reaction becomes "too active," and overheating results which then results in formation of oxides, and possibly the liberation of hydrogen and chlorine gas.

It has been found that a range of 150-300 ppm of silicon in the aluminum starting material is practical but the "critical amount" of starting material silicon can once again be determined empirically as a function of "growth" formation and/or overheating. As a practical matter the purity of the aluminum starting material usually controls the amount of silicon (whether in elemental or as silica) present. As stated previously, in the formation of the complex of this invention this "purity" should be of the order of at least about 99.97%. It should be noted that the purity of the aluminum starting material for the preparation of other products such as the "fuel" disclosed in my application Ser. No. 810,103 filed June 27, 1977 now abandoned and of my aforesaid copending application filed of even date herewith, need not be as stringent, and aluminum having a purity description of about 99.9% can as a practical matter be used therein. Again, however, this is an impirical determination.

B. In the slurry forming steps for the formation of the complex, the temperature as stated previously should not exceed about 30° C. In the formation of other products, such as the "fuel" indicated above, temperatues, i.e., in the slurry forming bath, can be tolerated as high as about 40° C.

It should thus be noted that as far as the slurry is concerned the purity of the aluminum starting material and the temperature of the forming step thereof is largely determined by the product being ultimately formed. Within the stated limits, i.e., of empirical determination, the same "slurry" intermediate is formed no matter to what use such intermediate is subsequently to be employed.

In the formation of the complex of this invention, it has been discovered that the particles of silicon of the aluminum foil, which in the beginning were in cylindrical form, also change into a hexagonal profile, when subjected to the attack of the entrapped, "active" chlorine-containing slurry intermediate. The pores of the aluminum under impact of the silicon assume a stellar form. The picture of the silicon cells is, therefore, that each silicon cell assumes a hexagonal prism shape with a spherically shaped base.

Thus it is clear that:

(1) Under certain circumstances traces of foreign particles in aluminum may become active and change form.

(2) During the process immense forces change the form of the aluminum structure itself.

In the present invention, it is believed the strange activation of the silicon into the hexagonal form results in the latter impacting in and upon the aluminum with such force that stellite marks are obtained. However, the tremendous impact force and strength of the silicon "bullets" can really only be immagined and/or theorized about.

To reiterate, in the formation of the complex, the silicon of the aluminum foil, even in trace amounts, becomes superactivated by the chlorine of the slurry. The observed hexagonal structure which then results apparently becomes the "bullet" which impacts upon the surrounding medium; in this invention, first the aluminum in stage five, and then when further activated or "excited" by the excess hydrogen of stage "six" of the aforedescribed process, on the oxygen and hydrogen ions of a surrounding hydrogen and oxygen-containing fluid. The "pressurization" of a container confining the latter results.

Although the present invention has been described with references to particular embodiments and examples, it will be apparent to those skilled in the art that variations can be made.

What is claimed is:

1. A method for preparing an activated silicon-containing aluminum complex which comprises:
   (a) Contacting substantially pure aluminum metal with a source of acid of a type which will remove and inhibit the formation of oxide thereon; simultaneously or thereafter contacting said aluminum metal with mercury or a source of mercury in an oxygen gas-containing atmosphere;
   (b) At least partly immersing said mercury-contacted aluminum in an acidic solution containing halogen ions to form a slurry of said mercury-contacted aluminum particles therein at a temperature of not more than about 30° C.;
   (c) Increasing the pH of said slurry to the pH wherein such halogen as is contained in the slurry material is active but is not capable of being liberated as halogen gas;
   (d) Contacting the surface of an aluminum material containing at least trace amounts of silicon atoms by weight, with the material of (c) above;
   (e) Heating said contacted surface to a temperature not higher than that at which halogen would be liberated as a gas; and under conditions of low humidity to insure that a hydrogen halide is not formed; for a period at least sufficient to observe a powder growing from the contacted surface of the silicon atom-containing aluminum which powder will have a ratio of oxygen to hydrogen atoms of 14:14, 16:16, or 18:18, or mixtures of such ratios;
   (f) Removing said powder and contacting such under substantially inert conditions with a flow of hydrogen gas for a time sufficient to form the desired activated silicon-aluminum complex having a ratio of oxygen to hydrogen atoms of 14:16, 16:18 or 18:20 or mixtures of such ratios.

2. A method according to claim 1 wherein the acid of step (a) is hydrochloric acid.

3. A method according to claim 1 wherein the acid solution containing halogen ions of step (b) is hydrochloric acid.

4. A method according to claim 1 wherein the pH of the slurry of step (b) is increased to 5.4±0.1.

5. A method as claimed in claim 4 wherein the pH is increased by the application of NaOH or KOH.

6. A method as claimed in claim 1 wherein the slurry of step (c) is spread over a wide area of the aluminum material.

7. A method as claimed in claim 1 wherein the temperature employed in step (e) is 40.5±0.5° C., and the humidity does not exceed 20%.

8. A method for preparing an activated-silicon containing aluminum complex capable of releasing hydrogen and oxygen from a hydrogen and oxygen containing fluid material, which comprises:
   (a) Contacting at ambient temperature aluminum metal in the form of a bar or rod and having a purity of at least about 99.97% by weight, with hydrochloric acid;
   (b) Subsequently immersing said aluminum bar or rod in a mercury bath;
   (c) Thereafter at least partly immersing said bar of mercury-contacted aluminum in a solution of HCl to form a white slurry of particles of said aluminum therein at a temperature of between about 22° C. and 25° C.;
   (d) Increasing the pH of the slurry to 5.4±0.1 by the addition of NaOH;
   (e) Contacting the surface of an aluminum foil containing trace to about 2% silicon atoms, the latter present as elemental silicon or in silica, with the slurry of step (d) above, said contact being effected by spreading of the slurry over a wide area of the aluminum material;
   (f) Heating the contacted surface at a temperature of 40.5±0.5° C. and under humidity of less than 20% for a period at least sufficient to observe a gray powder growing from the contacted surface of the aluminum foil;
   (g) Removing said powder, which has an oxygen to hydrogen ratio of 16:16;
   (h) Contacting said powder in a vacuum tube with a slow flow of hydrogen gas for a time and in an amount sufficient to form a complex having an oxygen to hydrogen ratio of 16:18;
   (i) Removing said complex as an intensely dark gray powder from the vacuum tube.

9. An activated silicon-containing aluminum complex produced by the process comprising;
   (a) Contacting aluminum metal having a purity of at least about 99.97% by weight, with a source of acid of a type which will remove and inhibit the formulation of oxide thereon; simultaneously or thereafter contacting said aluminum metal with mercury or a source of mercury in an oxygen gas-containing atmosphere;
   (b) At least partly immersing said mercury-contacted aluminum in an acidic solution containing halogen ions to form a slurry of said mercury-contacted aluminum particles therein; at a temperature of between ambient and not more than about 30° C.;
   (c) Increasing the pH of said slurry to the pH wherein such halogen as is contained in the slurry material is active but is not capable of being liberated as halogen gas;
   (d) Contacting the surface of an aluminum material containing amounts of from trace to about 2% silicon atoms by weight, with the material of (c) above;
   (e) Heating said contacted surface to a temperature not higher than that at which halogen would be liberated as a gas; and under conditions of low humidity to insure that a hydrogen halide is not formed; for a period at least sufficient to observe a powder growing from the contacted surface of the silicon atom-containing aluminum which powder will have a ratio of oxygen to hydrogen of 16:16 or 18:18 or mixtures thereof;

(f) Removing said powder and contacting such under substantially inert conditions with a flow of hydrogen gas for a time sufficient to form the desired activated silicon-aluminum complex having a ratio of oxygen to hydrogen atoms of 16:18 or 18:20 or mixtures thereof.

10. An activated silicon containing aluminum complex capable of releasing hydrogen and oxygen from a hydrogen and oxygen containing fluid, produced by the process comprising:
 (a) Contacting at ambient temperature aluminum metal in the form of a bar or rod and having a purity of at least about 99.97% by weight, with HCl
 (b) Subsequently immersing said aluminum bar or rod in a mercury bath;
 (c) Thereafter at least partly immersing said bar of mercury-contacted aluminum in solution of HCl to form a white slurry of particles of said aluminum therein, at a temperature of between about 22° C. and 25° C.;
 (d) Increasing the pH of the slurry to 5.4±0.1 by the addition of NaOH;
 (e) Contacting the surface of an aluminum foil containing trace to about 2% silicon atoms, the latter present as elemental silicon or in silica, with the slurry of step (d) above, said contact being effected by spreading of the slurry over a wide area of the aluminum material;
 (f) Heating the contacted surface at a temperature of 40.5±0.5° C. and under humidity of less than 20% for a period at least sufficient to observe a gray powder growing from the contacted surface of the aluminum foil;
 (g) Removing said powder;
 (h) Contacting said powder in a vacuum tube with a slow flow of hydrogen gas for a time and in an amount sufficient to form said complex having an oxygen to hydrogen ratio of 16:18;
 (i) Removing said complex as an intensely dark-gray powder from the vacuum tube.

11. An activated aluminum complex containing minor amounts of halogen, silicon, oxygen and hydrogen, the total of said halogen, silicon, oxygen and hydrogen not exceeding about 5% by weight of the aluminum; the silicon being present in at least trace amounts and having an hexagonal structured shaped; the halogen, being present in those amounts sufficient to activate the silicon; the ratio of oxygen to hydrogen being 14:16, 16:18 or 18:20 or mixtures thereof.

12. A complex according to claim 11 in which the halogen is chlorine.

13. A complex according to claim 12 in the form of an intensely dark-gray powder having a specific gravity of about 2.2.

14. An aluminum complex capable of being hydrogenated to form an activated aluminum complex, containing minor amounts of chlorine, silicon, oxygen and hydrogen, the total of said halogen, silicon, oxygen and hydrogen not exceeding about 5% by weight of the aluminum; the silicon being present in from trace to 2% by weight of the aluminum and having an hexagonal structured shape as shown in FIG. 5; the chlorine being present in those amounts sufficient to activate the silicon; the ratio o oxygen to hydrogen being 14:14, 16:16 or 18:18 or mixtures thereof.

15. An aluminum complex capable of being hydrogenated to form an activated aluminum complex, containing minor amounts of chlorine, silicon, oxygen and hydrogen, the total of said halogen, silicon, oxygen and hydrogen not exceeding about 5% by weight of the aluminum; the silicon being present in from trace to 2% by weight of the aluminum and having an hexagonal structured shape as shown in FIG. 5; the chlorine being present in those amounts sufficient to activate the silicon; the ratio of oxygen to hydrogen being 16:16 or 18:18.

16. A method for releasing oxygen and hydrogen under pressure from a hydrogen and oxygen containing fluid in a confined container, which comprises contacting said fluid with an activated aluminum complex containing minor amounts of halogen, silicon, oxygen and hydrogen, the total of said halogen, silicon, oxygen and hydrogen not exceeding about 5% by weight of the aluminum; the silicon being present in from trace to about 2% by weight of the aluminum and having an hexagonal structure shape, the halogen being present in those amounts sufficient to activate the silicon; the ratio of oxygen to hydrogen being 14:16, 16:18, 18:20 or mixtures thereof.

17. A method for releasing oxygen and hydrogen under pressure from a hydrogen and oxygen containing fluid in a confined container, which comprises contacting said fluid with an activated aluminum complex containing minor amounts of halogen, silicon, oxygen and hydrogen, the total of said halogen, silicon, oxygen and hydrogen not exceeding about 5% by weight of the aluminum; the silicon being present in from trace to about 2% by weight of the aluminum and having an hexagonal structured shape, the halogen being present in those amounts sufficient to activate the silicon; the ratio of oxygen to hydrogen being 16:18 or 18:20.

18. A method for releasing oxygen and hydrogen under pressure from a hydrogen and oxygen containing fluid in a confined container, which comprises contacting said fluid with an activated aluminum complex prepared by the method comprising:
 (a) Contacting aluminum metal having a purity of at least about 99.97% by weight, with a source of acid of a type which will remove and inhibit the formation of oxide thereon; simultaneously or thereafter contacting said aluminum metal with mercury or a source of mercury in an oxygen gas-containing atmosphere;
 (b) At least partly immersing said mercury-contacted aluminum in an acidic solution containing halogen ions to form a slurry of said mercury-contacted aluminum particles therein, at a temperature of between ambient and not more than about 30° C.;
 (c) Increasing the pH of said slurry to the pH wherein such halogen as is contained in the slurry material is active but is not capable of being liberated as halogen gas;
 (d) Contacting the surface of an aluminum material containing amounts of from trace to about 2% silicon atoms by weight, with the material of (c) above;
 (e) Heating said contacted surface to a temperature not higher than that at which halogen would be liberated as a gas; and under conditions of low humidity to insure that a hydrogen halide is not formed; for a period at least sufficient to observe a powder growing from the contacted surface of the silicon atom-containing aluminum which powder will have a ratio of oxygen to hydrogen atoms of 16:16 or 18:18 or mixtures thereof;

(f) Removing said powder and contacting such under substantially inert conditions with a flow of hydrogen gas for a time sufficient to form the desired activated silicon-aluminum complex having a ratio of oxygen to hydrogen atoms of 16:18 or 18:20 or mixtures thereof.

19. A method as claimed in claim 18 comprising:
(a) Contacting at ambient temperature aluminum metal in the form of a bar or rod and having a purity of at least 99.97% by weight, with hydrochloric acid;
(b) Subsequently immersing said aluminum bar or rod in a mercury bath;
(c) Thereafter at least partly immersing said bar of mercury-contacted aluminum in a solution of HCl to form a white slurry of particles of said aluminum therein at a temperature of between about 22° C. and 25° C.;
(d) Increasing the pH of the slurry to 5.4±0.1 by the addition of NaOH;
(e) Contacting the surface of an aluminum foil containing trace to about 2% silicon atoms, the latter present as elemental silicon or in silica, with the slurry of step (d) above, said contact being effected by spreading the slurry over a wide area of the aluminum material;
(f) Heating the contacted surface at a temperature of 40.5±0.5° C. and under humidity of less than 20% for a period at least sufficient to observe a gray powder growing from the contacted surface of the aluminum foil;
(g) Removing said powder, which has an oxygen to hydrogen ratio of 16:16;
(h) Contacting said powder in a vacuum tube with a slow flow of hydrogen gas for a time and in an amount sufficient to form a complex having an oxygen to hydrogen ratio of 16:18;
(i) Removing said complex as an intensely dark-gray powder from the vacuum tube.

20. A method according to claim 17 wherein a catalytic amount of aluminum is added.

21. A pressurizing catalyst which comprises an activated aluminum complex containing minor amounts of halogen, silicon, oxygen and hydrogen, the total of said halogen, silicon, oxygen and hydrogen not exceeding about 5% by weight of the aluminum; the silicon being present in from trace to about 2% by weight of the aluminum and having an hexagonal structured shape; the halogen being present in those amounts originally sufficient to activate the silicon; the ratio of oxygen to hydrogen being 14:16, 16:18 or 18:20 or mixtures thereof.

22. A pressurizing catalyst which comprises an activated aluminum complex containing minor amounts of halogen, silicon, oxygen and hydrogen, the total of said halogen, silicon, oxygen and hydrogen not exceeding about 5% by weight of the aluminum; the silicon being present in from trace to about 2% by weight of the aluminum and having an hexagonal structured shape; the halogen being present in those amounts originally sufficient to activate the silicon; the ratio of oxygen to hydrogen being 16:18 or 18:20.

23. A composition capable of being dispensed under pressure from a confined container in the form of a foam, liquid, gas or solid in the manner of an aerosol, which comprises an aerosol-type composition, minus propellant, which includes at least some ingredient containing hydrogen and oxygen, which aerosol composition minus propellant has been pressurized by an activated aluminum complex containing minor amounts of halogen, silicon, oxygen and hydrogen, the total of said halogen, silicon, oxygen and hydrogen not exceeding about 5% by weight of the aluminum; the silicon being present in from trace to about 2% by weight of the aluminum and having an hexagonal structured shape; the chlorine being present in those amounts originally sufficient to activate the silicon, the ratio of oxygen to hydrogen being 14:16, 16:18 or 18:20 or mixtures thereof.

24. A slurry comprising a suspension of at least 1.5% weight activated aluminum particles, said particles containing at least trace amounts of silicon, in a halogen acid bath, said silicon having an hexagonal structured form.

25. A slurry as claimed in claim 24 in which said aluminum particles have been previously contacted with mercury.

26. A slurry as claimed in claim 25 in which said mercury-contacted aluminum particles contain between about 150–300 ppm silicon, and in which said halogen acid in HCl.

27. A slurry as claimed in claim 24 in which the viscosity thereof is between about 12,000 and about 16,000 cps.

28. A slurry comprising:
(a) The reaction products of aluminum and a halogen acid;
(b) At least 1.5% by weight of unassociated elemental activated aluminum;
(c) Said aluminum particles of (b) having at least trace amounts of silicon.

29. A slurry as claimed in claim 28 in which the halogen acid is HCl, and the amount of elemental aluminum is between at least about 1.5 and 3.0% by weight.

30. A slurry as claimed in claim 28 in which the pH thereof is such that the halogen is active but is not capable of being liberated as halogen gas.

31. A method for preparing a slurry of activated silicon-containing aluminum particles in a halogen acid bath which comprises:
(a) Contacting essentially pure aluminum metal with a source of acid of a type which will remove and inhibit the formation of oxide thereon;
(b) Simultaneously or thereafter contacting said aluminum metal with mercury or a source of mercury in an oxygen gas-containing atmosphere;
(c) At least partly immersing said mercury-contacted aluminum in a acidic solution containing halogen ions to form a slurry of at least 1.5% by weight of aluminum particles therein at a temperature of not more than about 40° C.

32. A method as claimed in claim 31 in which the source of acid in step (a) is HCl.

33. A method as claimed in claim 31 in which the source of acid in step (c) is HCl.

34. A method as claimed in claim 31 in which the pH of the slurry is increased to the pH wherein said halogen in the slurry is active but is not capable of being liberated as a halogen gas.

35. A method for preparing a slurry of activated silicon-containing aluminum particles in a halogen bath which comprises:
(a) Contacting at ambient temperature aluminum metal in the form of a bar or rod and having a purity of at least about 99.9% by weight with hydrochloric acid;

(b) Subsequently immersing said aluminum bar or rod in a mercury bath;
(c) Thereafter at least partly immersing said bar of mercury-contacted aluminum in a solution of HCl to form a white slurry of at least 1.5% by weight particles of said aluminum therein, at a temperature of between ambient and about 40° C.

* * * * *